July 22, 1924.
G. E. HILL ET AL
1,501,948
CUTTING TOOL
Filed Sept. 23, 1922
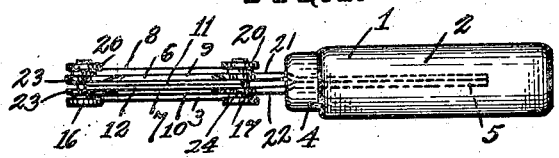
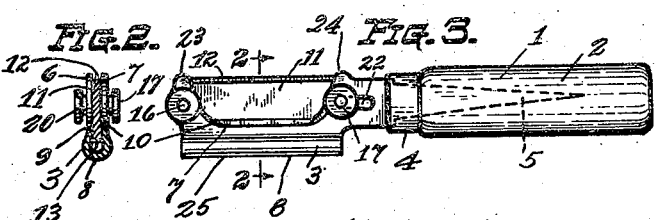
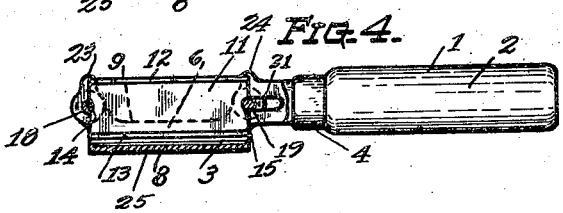
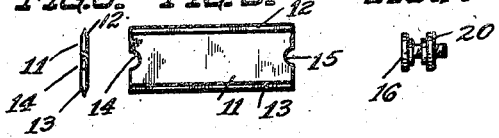
GEORGE E. HILL,
R. H. WILLIAMS,
INVENTORS.
BY *William A. Hoyle*
ATTORNEY.

Patented July 22, 1924.

1,501,948

UNITED STATES PATENT OFFICE.

GEORGE E. HILL, OF PITTSBURGH, AND RAYMOND R. WILLIAMS, OF GLENSHAW, PENNSYLVANIA.

CUTTING TOOL.

Application filed September 23, 1922. Serial No. 590,128.

*To all whom it may concern:*

Be it known that GEORGE E. HILL, a subject of the King of Great Britain, and RAYMOND R. WILLIAMS, a citizen of the United States of America, residing at Pittsburgh, Pa., and Glenshaw, Pa., respectively, in the county of Allegheny and State of Pennsylvania, have invented certain new and useful Improvements in Cutting Tools, of which the following is a specification.

The present invention relates to cutting tools, and has for its purpose the provision of a tool of this kind which has replaceable and reversible cutting blades, and is provided with ingenious means for securely holding said blade in position in the tool. Means are also provided for expeditious removal of the cutting blade used with the device, and other advantages which will be more fully described as the description proceeds hereinafter in this specification.

In the accompanying drawings forming part of this specification is shown one form of the physical embodiment of the present invention. In the drawings:—

Figure 1 is an edge or top view of the cutting tool.

Figure 2 is a vertical section on line 2—2 of Figure 3.

Figure 3 is a side view of Figure 1.

Figure 4 is a central vertical section of the invention.

Figure 5 is an end view of Figure 6 and shows a cutting blade used with the device in hand.

Figure 6 is a side view of the same cutting blade.

Figure 7 is a side view of a fastening means used.

The numeral 1 of the drawings indicates a cutting tool composed of handle 2, and a blade or knife holder 3. The handle 2 is of usual construction having a ferrule 4 as clearly shown in the Figure 3. The blade holder 3 has a sharpened end 5 which is driven into the handle 2 in the usual fashion.

The blade holder 3 is of shape shown having two opposed vertical and substantially parallel leaves 6 and 7, which are joined at their bases by preferably rounded and resilient portion 8. These leaves are cut away at 9, 10 exposing the blade 11, and the edges of the side walls are preferably beveled as shown.

The numeral 11 indicates a double-edged cutting or knife blade having cutting edges at 12 and 13. The blade 11 as clearly indicated in Figures 5 and 6 of the drawings is also provided with indentations at 14 and 15. The blade 11 is placed between the parallel leaves 6, 7, after the two screw bolts have been removed from the blade holder 3. After the blade 11 is in position, the bolts are placed passing through the openings 18, 19 of the blade holder 3 through the indentations 14, 15 of the blade 11, and said bolts are then tightened by means of the nuts 20, 20, and the blade made secure in its operative position between the holder leaves 6 and 7. It is evident from the drawings that by means of the slots 21, 22 in the leaves of the blade holder 3, which are enlongated in shape, that in removing a blade 11 from the tool, the bolts 16, 17 need only be loosened, and bolt 17 slid along the enlongated apertures 21, 22, in order to permit the blade 11 to be removed. In this way the insertion of a new blade, or the old one reversed so that the unused edge 13 of the blade can be used, is readily accomplished.

The holder leaves 6, 7 are provided with embossed or raised portions at 23, 23 and 24, 24, forming a protection for the working edge 12 of the blade 11 as is readily understood.

It is further noted that the leaves 6, 7 are preferably united as before stated by a resilient portion 8, so that when the bolts 16, 17 are loosened, the tendency of the leaves is to spring apart thereby enabling the blade 11 to be readily removed from the holder 3, and another or the same one inserted. The edges at 9 and 10 of the leaves 6, 7 of the holder are beveled so as to turn away from the tool conveniently the shavings of wood or other material being operated upon by the tool. The construction of the blade holder 3 it is noted is such that it can be "stamped" or cut from a single piece of material when the leaves 6, 7 are "developed" or laid out flat, which as it is readily seen greatly facilitates the manufacture, and reduces the cost of same.

One of the particular uses of the tool under consideration is for sharpening lead pencils, and it has been found particularly useful when used with the thumb of the left hand of the user placed upon the part 8 at point 25, and a slight pressure exerted in the direction of cutting by the thumb of the user. Other uses will readily suggest themselves for the present invention and it is further seen that the blades may be replaced or renewed using the same holder indefinitely, similarly to the replacements made with the well known "safety razor" in common use.

From which it is evident that we have provided an efficient device for the purpose intended.

We claim:

1. In a cutting tool, a blade holder comprising a pair of opposed leaves, each having an elongated bolt hole therethrough adapted to permit the slidable operation of a bolt therein, a cutting blade between the leaves having an indentation formed in each end thereof, and means passing through the cutting blade indentations and the holder leaves, for securing the said cutting blade in operative position.

2. In a cutting tool, a blade holder comprising a pair of opposed leaves, each having an elongated bolt hole therethrough adapted to permit the reciprocation of a bolt therein, a cutting blade positioned between the holder leaves and having an indentation formed in each end thereof, and a pair of bolts passing through the holder leaves and the indentations of the cutting blade for holding the latter in operative position.

3. In a cutting tool, a blade holder comprising a pair of oppositely disposed leaves, each having a cut-away side wall and an elongated bolt hole passing therethrough adapted to permit the reciprocation of a securing bolt, a cutting blade between the holder leaves having an indentation formed in each end thereof, a pair of upward extensions on the side walls of each holder leaf adapted to form a protection for the cutting edge of the aforesaid cutting blade, and means for securing the cutting blade in position.

4. In a cutting tool, a holder comprising a pair of substantially parallel resilient leaves, each provided with an elongated bolt aperture, a blade having an indentation on each end positioned between the holder leaves, a pair of upward extensions formed on each of the holder leaves in proximate relation with the ends of the cutting blade, beveled cut-away portions formed in the sidewalls of the holder leaves, and means for securing the cutting blade in operative position.

5. In a cutting tool, a holder comprising a pair of opposed resilient leaves, each provided with an elongated bolt aperture, a cutting blade having an indentation on each end adapted to receive a bolt stem, a pair of upwardly extending bosses formed on each of the holder leaves and in proximate relation with the ends of the cutting blade, beveled cut-away portions formed in the sidewalls of each of the holder leaves, and a pair of securing bolts passing through the holder leaves and the cutting blade indentations for holding the latter in operative position between the leaves of the blade holder.

In testimony whereof we affix our signatures.

GEORGE E. HILL.
RAYMOND R. WILLIAMS.

Witnesses:
WILLIAM A. HIRTLE,
CAROLINE LOEWENTHAL.